United States Patent [19]

Hall et al.

[11] Patent Number: 5,089,151
[45] Date of Patent: Feb. 18, 1992

[54] FLUID ADDITIVE AND METHOD FOR TREATMENT OF SUBTERRANEAN FORMATIONS

[75] Inventors: Bobby E. Hall, Richmond; Clarita A. Szememyei, The Woodlands, both of Tex.

[73] Assignee: The Western Company of North America, Houston, Tex.

[21] Appl. No.: 605,573

[22] Filed: Oct. 29, 1990

[51] Int. Cl.⁵ .................. E21B 43/26; E21B 43/22; C09K 7/02
[52] U.S. Cl. .................. 252/8.551; 166/300; 252/8.554; 252/8.553; 507/131
[58] Field of Search ............... 252/8.551, 8.554, 8.553, 252/8.51, 8.513, 8.514; 166/300; 501/148

[56] References Cited

U.S. PATENT DOCUMENTS

| | | |
|---|---|---|
| 1,797,877 | 3/1931 | Moore . |
| 2,414,668 | 6/1942 | Ratcliffe . |
| 2,761,835 | 9/1956 | Brown et al. . |
| 2,761,836 | 9/1956 | Brown . |
| 2,761,840 | 9/1956 | Brown . |
| 2,761,843 | 9/1956 | Brown . |
| 2,841,222 | 7/1958 | Smith . |
| 3,108,069 | 10/1963 | Monroe et al. . |
| 3,199,591 | 12/1962 | Kepley . |
| 3,349,032 | 1/1965 | Krieg . |
| 3,377,274 | 4/1968 | Burke et al. . |
| 3,412,019 | 11/1968 | Hoover et al. . |
| 3,422,890 | 1/1969 | Darley . |
| 3,500,925 | 3/1970 | Beiswanger . |
| 3,578,781 | 5/1971 | Abrams et al. . |
| 3,768,566 | 10/1973 | Ely et al. . |
| 4,142,595 | 3/1979 | Anderson . |
| 4,158,521 | 6/1979 | Anderson . |
| 4,366,071 | 12/1982 | McLaughlin et al. . |
| 4,439,328 | 3/1984 | Moity ........................ 252/8.512 |
| 4,440,649 | 4/1984 | Loftin . |
| 4,462,718 | 7/1984 | McLaughlin . |
| 4,464,274 | 8/1984 | House ........................ 252/8.5 P X |
| 4,517,112 | 5/1985 | Mardis et al. ............... 252/8.5 M X |
| 4,526,693 | 7/1985 | Son et al. . |
| 4,580,633 | 4/1986 | Watkins . |
| 4,662,444 | 5/1987 | Yang . |
| 4,725,372 | 2/1988 | Teot et al. ................... 252/8.514 |
| 4,842,073 | 3/1988 | Himes et al. . |

OTHER PUBLICATIONS

"How to Combat Swelling Clays" by John E. Moore.
"The Existence of a Critical Salt Concentration for Particle Release" by K. C. Khilar and H. S. Fogler.

Primary Examiner—Robert L. Stoll
Assistant Examiner—Gary L. Geist
Attorney, Agent, or Firm—Pravel, Gambrell, Hewitt, Kimball & Krieger

[57] ABSTRACT

A treatment fluid additive and method for treatment of subterranean formations to minimize formation permeability damage as a result of formation contact by the treatment fluid, wherein the fluid treatment additive is a formation control additive of the general formula:

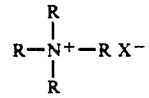

wherein R is independently a $C_1$ to $C_4$ alkyl, halogen and/or hydroxyl substituted alkyl and at least one R is a $C_1$ to $C_4$ halogen or hyroxyl substituted alkyl, and $X^-$ is selected from the group consisting of chloride, fluoride, bromide, iodide, nitrate, nitrite hydroxide, and sulfate.

25 Claims, No Drawings

FLUID ADDITIVE AND METHOD FOR TREATMENT OF SUBTERRANEAN FORMATIONS

BACKGROUND OF THE INVENTION

The present invention relates to a method and composition for use in treating subterranean formations. More particularly this invention relates to a method and formation control additive for use in treating subterranean formations containing clays and other fines. Most particularly, this invention relates to a formation control additive and method for use in fracturing a subterranean formation containing clays and other fines.

It is well known that the production of oil and gas is many times hindered by the presence of clays and other fines capable of swelling and/or migrating in the formation. The clays or fines may be already present or may be introduced into the formation during formation treating activity. In some instances, the clays and fines are quiescent causing no obstruction to the flow of hydrocarbons through the subterranean formation. However, when the clays or fines are distributed, the clays can swell or the fines can migrate through the formation until they become lodged in pore throats, thereby decreasing the permeability of the formation.

Unfortunately, most treatment activity associated with the production of oil and gas has the potential to disturb the quiescent clays and fines. For example, in a steam drive operation, steam is injected via one well and acts as a drive fluid to push oil through the formation to one or more offset wells. In a steam soaking operation, steam is injected via a well, the well is then shut in temporarily and allowed to soak, and subsequently production is commenced from the same well. In either instance, when steam reaches the subterranean formation, it at least partially condenses, thus exposing the formation to fresh water. Even though steam may act to mobilize the oil in the formation, if the formation contains fines and water-sensitive clays, the permeability of the formation can be reduced.

Other formation treatment operations such as fracturing, acidizing, perforating, drilling, waterflooding, as well as others, can disturb the clays and fines causing a loss of formation permeability.

Because oil and gas production can be effected by the presence of clays and other fines, the prior art is replete with examples of various methods and formation control agents designed to minimize clay swelling and fine migration. One idea has been to convert the clay from a swelling form by cation exchange to a less swelling form, by the addition of various known salts to the aqueous fluids utilized in the various treatment methods. Salts such as potassium chloride, sodium chloride, ammonium chloride and the like are typically dissolved in the aqueous fluid utilized to effect the formation treatment. While these salts are effective at protecting the formation, they can be detrimental to the performance of other constituents of the treatment fluid. Furthermore, it is difficult to dissolve the various salts in viscosified fluid due to the inability to effect adequate mixing for the large volumes of salts required in commercially available mixing equipment utilized in oil field services. Therefore, the salts are typically admixed with the aqueous fluid before admixture of any viscosifying or gelling agents to the aqueous fluid. These salts, however, may have a detrimental effect upon the viscosity yield by the gelling agent upon hydration in the aqueous fluid.

Other ideas for minimizing clay swelling and fines migration include the use in treatment fluids of nitrogen base compounds as described in U.S. Pat. Nos. 2,761,835 and 2,761,843, or by the use in treatment fluids of water-soluble anionic, cationic or non-ionic surfactants. These methods, however, have been found to be essentially ineffective particularly when these so-called treated formations are subjected to fresh water flooding operations.

Disclosed in U.S. Pat. No. 4,842,073 is the use in a treatment fluid of a tetra alkyl ammonium salt, wherein the alkyl groups are non-substituted and have from 1 to 4 carbon atoms.

While each of the prior art treatments to stabilize clays in a formation have met with some success in particular applications, the need exists for a further improved method for treating clay and fines in formations to minimize the adverse effect of clays and fines on the permeability of the formation, particularly when the clays and fines are contacted by a treatment fluid comprising water.

It is therefore an object of this invention to provide for a further improved formation control additive and method for treating a formation containing clays and fines.

SUMMARY OF INVENTION

According to this invention there is provided a formation treatment fluid comprising: an aqueous fluid, a selected gelling agent and a formation control additive of the general formula:

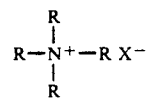

wherein R is independently a $C_1$ to $C_4$ alkyl or halogen substituted alkyl and at least one R is a $C_1$ to $C_4$ halogen and/or hydroxyl substituted alkyl, and $X^-$ is selected from the group consisting of chloride, fluoride, bromide, iodide, nitrate, nitrite, hydroxide, and sulfate, wherein at least one $X^-$ is not hydrogen.

Further according to this invention there is provided a method of treating a subterranean formation comprising contacting the formation with an aqueous solution of a treatment fluid containing a formation control additive of the general formula:

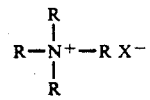

wherein R is independently a $C_1$ to $C_4$ alkyl or halogen substituted alkyl and at least one R is a $C_1$ to $C_4$ halogen and/or hydroxyl substituted alkyl, and $X^-$ is selected from the group consisting of chloride, fluoride, bromide, iodide, nitrate, nitrite, hydroxide, and sulfate.

Still according to this invention there is provided a method of stimulating production of hydrocarbons from a clay-containing formation comprising: preparing an aqueous treatment fluid comprising an aqueous fluid, a selected gelling agent and a formation control additive of the general formula:

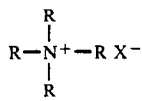

wherein R is independently a $C_1$ to $C_4$ alkyl or halogen substituted alkyl and at least one R is a $C_1$ to $C_4$ halogen and/or hydroxyl substituted alkyl, and $X^-$ is selected from the group consisting of chloride, fluoride, bromide, iodide, nitrate, nitrite, hydroxide, and sulfate; and contacting said formation with said aqueous treatment fluid under conditions that at least one fracture is caused to be created in said formation by said fluid whereby the subsequent production of hydrocarbons is facilitated, said formation control additive being present in said treatment fluid in an effective amount whereby permeability damage resulting from contact of the clays in the formation with the aqueous treatment fluid is reduced.

DETAILED DESCRIPTION OF THE INVENTION

The formation control additive of the present invention is of the general formula:

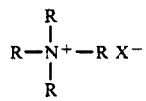

The R groups are independently selected from $C_1$ to $C_4$ halogen and/or hydroxyl substituted alkyls, with at least one R selected from $C_1$ to $C_4$ halogen substituted alkyls. Suitable examples of $C_1$ to $C_4$ alkyls are $-CH_3$, $-C_2H_5$, $-C_3H_7$ and $C_4H_9$. The halogen and/or hydroxyl substituted alkyls may be mono-, di- or tri halogen substituted. Preferably, the substituted alkyl is 2-bromoethyl, 2-hydroxylethyl or 2-chloroethyl. Preferably, the formation control additive is (2-chloroethyl) trimethylammonium chloride, (2-bromoethyl) trimethylammonium chloride, or (2-hydroxylethyl) ammonium chloride. Most preferably, the formation control additive is (2-chloroethyl) trimethylammonium chloride.

Generally, X is a halide anion, or any other ion which is compatible with the subterranean formation to be treated, and the constituents of the treating fluid. Preferably, X is selected from the group consisting of chloride, bromide, fluoride, iodide, nitrate, nitrite and sulfate. Preferably X is a halide, most preferably X is chloride.

The formation control additive is generally suitable for use in the treatment fluid of any type of formation treatment. Suitable treatments include steam soaking, steam drive, water flooding, drilling, perforating, acidizing as well as others. These treatments are well known to one of ordinary skill in the oil and gas production art.

In steam drive and steam soaking operations, the formation control additive of the present invention can be mixed in and injected with the steam. When used in such operations, the formation control additive generally comprises in the range of about 0.0167 weight percent to about 0.667 weight percent, preferably about 0.033 weight percent to about 0.333 weight percent of the injected steam.

In water flooding operations, an aqueous drive fluid is injected into the formation and acts as a drive fluid to push oil through the formation to one or more offset wells. The formation control additive of the present invention when used in water flooding, will generally comprise in the range of about 0.1667 weight percent to about 0.667 weight percent, preferably about 0.033 weight percent to about 0.333 weight percent, percent of the water injected.

When oil and gas wells are cased, it is necessary to perforate the casing or to drill out a section of open hole below the casing in order to complete the well and start production. However, in a well completion operation, the fluid in the well bore may damage the permeability, of the formation because it often rushes into the formation when the casing is opened up. The well can be completed as an open hole or by perforating using shaped charges or bullets. As a component in the completing fluid, the formation control additive of the present invention would prevent damage to the permeability if the pressure in the well is higher than the formation pressure causing the well fluids to enter the formation. When the formation control additive of the present invention is used in well completion fluids it generally comprises in the range of about 0.0167 weight percent to about 0.667 weight percent, preferably about 0.033 weight percent to about 0.333 weight percent, of the completion fluid.

Hydraulic fracturing has been utilized for many years to stimulate the production of oil, gas and other formation fluids from subterranean formations. In hydraulic fracturing, a suitable fluid is introduced into a subterranean formation by way of a wellbore under conditions of flow rate and pressure which are at least sufficient to create or extend a fracture into a desired portion of the formation. Fracturing fluid that bleeds into the fracture face often interacts with clays and damages permeability of the formation adjacent to fracture. This damage can be minimized by incorporating the formation control additive of the present invention into the fracturing fluid in the range of about 0.0167 weight percent to about 0.667 weight percent, preferably about 0.033 weight percent to about 0.333 weight percent, of the fracturing fluid.

Generally, the treatment fluids can comprise other components known in the art for that particular treatment method. For example, fracturing fluid generally comprises an aqueous fluid and a polymeric gelling agent. A common gelling agent is a solvatable polysaccharide. The solvatable polysaccharides include galactomannan gums, glucomannan gums, cellulose derivatives and the like and biopolymers such as xanthan gums. In addition, the fracturing fluid may comprise a crosslinking agent for the gelling agent, bactericides, breakers, iron control agents, foaming agents, surfactants, gases or liquified gases, stabilizers, proppants and the like.

The preparation of such fluids and the various additives are well known to individuals of ordinary skill in the art. The formation control agent is incorporated into the treating fluids utilizing the known art methods.

The formation control additive can be admixed with the fracturing fluid at any time prior to contact of the fluid with the subterranean formation. In that the formation control additives are readily available as liquid solutions, they readily admix with the constituents of the aqueous fracturing fluid both prior to and subsequent to hydration of the gelling agent. The use of the present formation control additives is particularly advantageous in stimulation treatments performed with liquid gel concentrates, such as those described in U.S.

Pat. Nos. 4,312,675; 4,435,217; 3,894,880; 3,894,879; and 4,466,890. The formation control additive is effective in treating a subterranean formation when transported in a carrier fluid, such as a fracturing fluid having either an acid, alkaline or neutral pH. The formation control additive carrier may have a pH in the range of from about 1 to 11 without any significant detrimental effect upon the formation control additive.

The formation control additive may be admixed with the constituents of aqueous liquid gel concentrate during its preparation whereupon it remains storage stable or admixed with the gel concentrate when the gelled fracturing fluid is prepared by introduction into a mixing vessel or blended together with the other fracturing fluid additives. The formation control additives of the present invention do not result in the mixing problems associated with previously used salts and do not appear to have any significant detrimental effect upon the hydration or ultimate yield of the gelling agent utilized to prepare the fracturing fluid.

Clays which may be present originally in natural geological formations or which may have been introduced therein and which can be effectively treated in accordance with the present invention include clay minerals of the montmorillonite (smectite) group, such as montmorillonite, saponite, nontronite, hectorite, and sauconite; the kaolin group, such as kaolinite, nacrite, dickite, and halloysite; the hydrous mica group such as hydrobiotite, glauconite, illite and bramallite; the chlorite group, such as chlorite and chamosite; clay minerals not belonging to the above groups, such as vermiculite, attapulgite, and sepiolite, and mixed-layer varieties of the above minerals and groups. The clay content of the formations can be comprised substantially of a single species of clay mineral, or of several species, including the mixed-layer types of clay. Of the clay minerals commonly encountered in natural geological formations which can cause problems as herein noted and which can be treated effectively in accordance with the present invention are clay minerals selected from the class consisting of the montmorillonite group, hydrous mica group, chlorite group, kaolin group and mixed layer types containing several of the classes. It will be understood that the clay formations treated in accordance with the invention need not be composed entirely of clay but may contain other mineral components associated therewith.

To illustrate the effectiveness of the formation control additives at preventing substantial permeability reduction upon the contact of an aqueous fluid with a formation, the following examples are presented. The examples are not to be considered as limitations upon the scope of the present invention but are presented for illustration only. All quantities, proportions and percentages are by weight, and all tests were performed at room temperature unless otherwise indicated.

EXAMPLE 1

0.1 M cation solution of the products were prepared (i.e. 5.975 g/l of NaCl, 7.615 g/l of KCl, 11.296 g/l of tetramethyammonium chloride, "TMAC," 12.3936 g/l of ethyl trimethylammonium chloride "ETMAC," and 16.210 g/l of (2-chloroethyl) trimethylammonium chloride "CETMAC"). To 100 ml of each of these solutions, 5 g of API bentonite was added and mixed thoroughly in a Waring Blender. After 5 minutes, 5 ml samples were removed and capillary suction times were obtained on a Fann Capillary Suction Timer (CST). Table 1 below gives the capillary suction times in seconds.

TABLE 1

| Additive | Time (seconds) |
|---|---|
| NaCl | 526.3 |
| KCl | 205.5 |
| TMAC | 32.8 |
| ETMAC | 29.9 |
| CETMAC | 23.8 |

In these tests, a low time is indicative of more effective clay testing. Therefore, CETMAC was the best chemical tested and NaCl was the worst.

EXAMPLE 2

A mixture of 90 g of Oklahoma #1 sand, 8 g of silica flour and 2 g of sodium bentonite were loaded into a one inch I.D. plexiglass column. A one-hole stopper was fitted into the bottom of the column.

The following fluids were flowed in order through the hydrated (5% NaCl) silicate column at 7 psig of air pressure. The treating fluid comprised deionized water with the wt. % of the additive as shown in TABLE 2.

| | |
|---|---|
| 500 ml | 5% NaCl |
| 20 ml | treating fluid |
| 10 ml | treating fluid |
| 500 ml | 5% NaCl |
| 1000 ml | water |

The test conditions were as follows:

| | |
|---|---|
| Temperature: | 70° F. |
| Pressure: | 7 psig |
| Column: | 90 g Oklahoma #1 |
| | 8 g Silica Flour |
| | 2 g Na Bentonite |

The results are listed in Table 2.

TABLE 2

| Sequential Volume | Fluid | Flow Rate (cc/min) | | | | |
|---|---|---|---|---|---|---|
| | | 2 wt. % KCl | 5 wt. % CETAC (33% Active) | .5 wt. % CETAC (100% Active) | 0.5 wt. % ETMAC (33% Active) | 0.5 wt. % TMAC (33% Active) |
| 500 ml | 5 wt. % NaCl | 10.6 | 14.3 | 1.3 | 9.5 | 9.7 |
| 20 ml | Treating Fluid | 10.4 | 11.8 | 17.9 | 5.6 | 5.1 |
| 10 ml | Treating Fluid | 9.8 | 2.3 | 12 | 2.4 | 2.2 |
| 500 | 5 wt. % NaCl | 8.4 | 1.5 | 13.6 | 1.2 | 1.2 |
| 1000 | Water | 0.25 | 0.2 | 1 | 0.6 | 0.4 |

We claim:

1. A formation treatment fluid comprising: an aqueous fluid, a selected gelling agent and a formation control additive of the general formula:

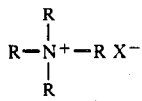

wherein R is independently a $C_1$ to $C_4$ alkyl, halogen substituted alkyl or hydroxyl substituted alkyl and at least one R is a $C_1$ to $C_4$ halogen substituted alkyl, and $X^-$ is selected from the group consisting of chloride fluoride, bromide, iodide, nitrate, nitrite, hydroxide and sulfate.

2. The composition of claim 1 wherein the formation control additive is present in the treating fluid in the range of about 0.0167 to about 0.667 weight percent.

3. The composition of claim 2 wherein X is a halogen selected from the group consisting of chlorine, bromine, iodine and fluorine.

4. The composition of claim 3 wherein the halogen substituted alkyls are chlorine substituted.

5. The composition of claim 1 wherein the gelling agent is a polysaccharide gelling agent.

6. A formation treatment fluid comprising: an aqueous fluid, a selected gelling agent and a formation control additive wherein the formation control additive comprises at least one of (2-chloroethyl) trimethylammonium chloride or (2-bromoethyl) trimethylammonium chloride.

7. The formation treatment fluid of claim 6 wherein the formation control additive is present in the treatment fluid in the range of about 0.0167 to about 0.667 weight percent.

8. The formation treatment fluid of claim 6 wherein the formation control additive comprises (2-chloroethyl) trimethylammonium chloride.

9. The formation treatment fluid of claim 8 wherein the formation control additive is present in the treatment fluid in the range of about 0.0167 to about 0.667 weight percent.

10. A method of treating a subterranean formation comprising contacting the formation with an aqueous solution treatment fluid containing a formation control additive of the general formula:

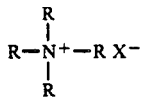

wherein R is independently a $C_1$ to $C_4$ alkyl or halogen substituted alkyl, or hydroxyl substituted alkyl and at least one R is a $C_1$ to $C_4$ halogen substituted alkyl, and $X^-$ is selected from the group consisting of chloride, fluoride, bromide, iodide, nitrate, nitrite, hydroxide, and sulfate.

11. The method of claim 10 wherein the formation control additive is present in the treating fluid in the range of about 0.0167 to about 0.667 weight percent.

12. The method of claim 11 wherein X is a halogen selected from the group consisting of chlorine, bromine, iodine and fluorine.

13. The method of claim 12 wherein the halogen substituted alkyls are chlorine substituted.

14. A method of treating a subterranean formation comprising contacting the formation with an aqueous solution of a treatment fluid containing a formation control additive of the general formula:

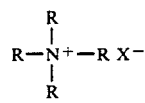

wherein R is independently a $C_1$ to $C_4$ alkyl, or halogen substituted alkyl or hydroxyl substituted alkyl and at least one R is a $C_1$ to $C_4$ halogen substituted alkyl or hydroxyl substituted alkyl, and $X^-$ is selected from the group consisting of chloride, fluoride, bromide, iodide, nitrate, nitrite, hydroxide and sulfate; and contacting said formation with said aqueous treatment fluid under conditions that at least one fracture is caused to be created in said formation by said fluid whereby the subsequent production of hydrocarbons is facilitated, said formation control additive being present in said treatment fluid in an effective amount whereby permeability damage resulting from contact of the clays in the formation with the aqueous treatment fluid is reduced.

15. The composition of claim 14 wherein the formation control additive comprises (2-hydroxylethyl) trimethylammonium chloride.

16. The method of claim 14 wherein the gelling agent is a polysaccharide gelling agent.

17. The method of claim 14 wherein the formation control additive is present in the treating fluid in the range of about 0.0167 to about 0.667 weight percent.

18. The method of claim 17 wherein X is a halogen selected from the group consisting of chlorine, bromine, iodine and fluorine.

19. The composition of claim 18 wherein the formation control additive comprises at lease one of (2-chloroethyl) trimethylammonium chloride or (2-bromoethyl trimethylammonium chloride.

20. The method of claim 18 wherein the halogen substituted alkyls are chlorine substituted.

21. The method of claim 20 wherein the formation control additive is (2-chloroethyl) trimethylammonium chloride.

22. A method of treating a subterranean formation comprising contacting the formation with an aqueous solution treatment fluid wherein the formation control additive comprises at least one of (2-chloroethyl) trimethylammonium chloride or (2-bromoethyl) trimethylammonium chloride.

23. A method of claim 22 wherein the formation control additive is present in the treatment fluid in the range of about 0.0167 to about 0.667 weight percent.

24. The method of claim 22 wherein the formation control additive comprises (2-chloroethyl) triethylammonium chloride.

25. The method of claim 24 wherein the formation control additive is present in the treatment fluid in the range of about 0.0167 to about 0.667 weight percent.

* * * * *